US009805737B2

(12) United States Patent
Kim et al.

(10) Patent No.: US 9,805,737 B2
(45) Date of Patent: Oct. 31, 2017

(54) APPARATUS AND METHOD FOR PROCESSING SENSING DATA

(71) Applicants: FINE INSTRUMENTS CORPORATION, Incheon (KR); Soo Chul Kim, Incheon (KR)

(72) Inventors: Soo Chul Kim, Incheon (KR); Yong Jong Won, Incheon (KR)

(*) Notice: Subject to any disclaimer, the term of this patent is extended or adjusted under 35 U.S.C. 154(b) by 0 days.

(21) Appl. No.: 15/176,454

(22) Filed: Jun. 8, 2016

(65) Prior Publication Data

US 2017/0278526 A1 Sep. 28, 2017

(30) Foreign Application Priority Data

Mar. 22, 2016 (KR) ........................ 10-2016-0033866

(51) Int. Cl.
*G06F 17/00* (2006.01)
*G10L 21/14* (2013.01)
*G05B 15/02* (2006.01)
*G06F 3/16* (2006.01)

(52) U.S. Cl.
CPC .............. *G10L 21/14* (2013.01); *G05B 15/02* (2013.01); *G06F 3/162* (2013.01); *G06F 3/165* (2013.01)

(58) Field of Classification Search
CPC ......... G06F 3/162; G06F 3/165; G05B 15/02; G10L 21/14
See application file for complete search history.

(56) References Cited

FOREIGN PATENT DOCUMENTS

KR 10-0892122 4/2009

OTHER PUBLICATIONS

Ye-Sheng Kuo, Sonal Verma, Thomas Schmid, and Prabal Dutta. 2010. Hijacking power and bandwidth from the mobile phone's audio interface. In Proceedings of the First ACM Symposium on Computing for Development (ACM DEV '10). ACM, New York, NY, USA, , Article 24 , 10 pages.*
English translation of 10-0892122.

* cited by examiner

*Primary Examiner* — Joseph Saunders, Jr.
(74) *Attorney, Agent, or Firm* — Antonio Ha & U.S. Patent, LLC

(57) ABSTRACT

According to an embodiment of the present disclosure, an apparatus for processing sensing data comprises an amplifier amplifying analog sensing data inputted from an outside source, an analog-digital converter converting the amplified analog sensing data into digital sensing data, a micro controller unit (MCU) including a signal modulator modulating the digital sensing data to a data wave having a sound waveform, transmittable to a sound input port of a terminal, and an output unit having a sound output terminal corresponding to the sound input port and outputting the data wave to the sound input port through the sound output terminal, wherein the data wave inputted to the sound input port is converted to an information value corresponding to the analog sensing data, and the information value is displayed on the terminal.

6 Claims, 4 Drawing Sheets

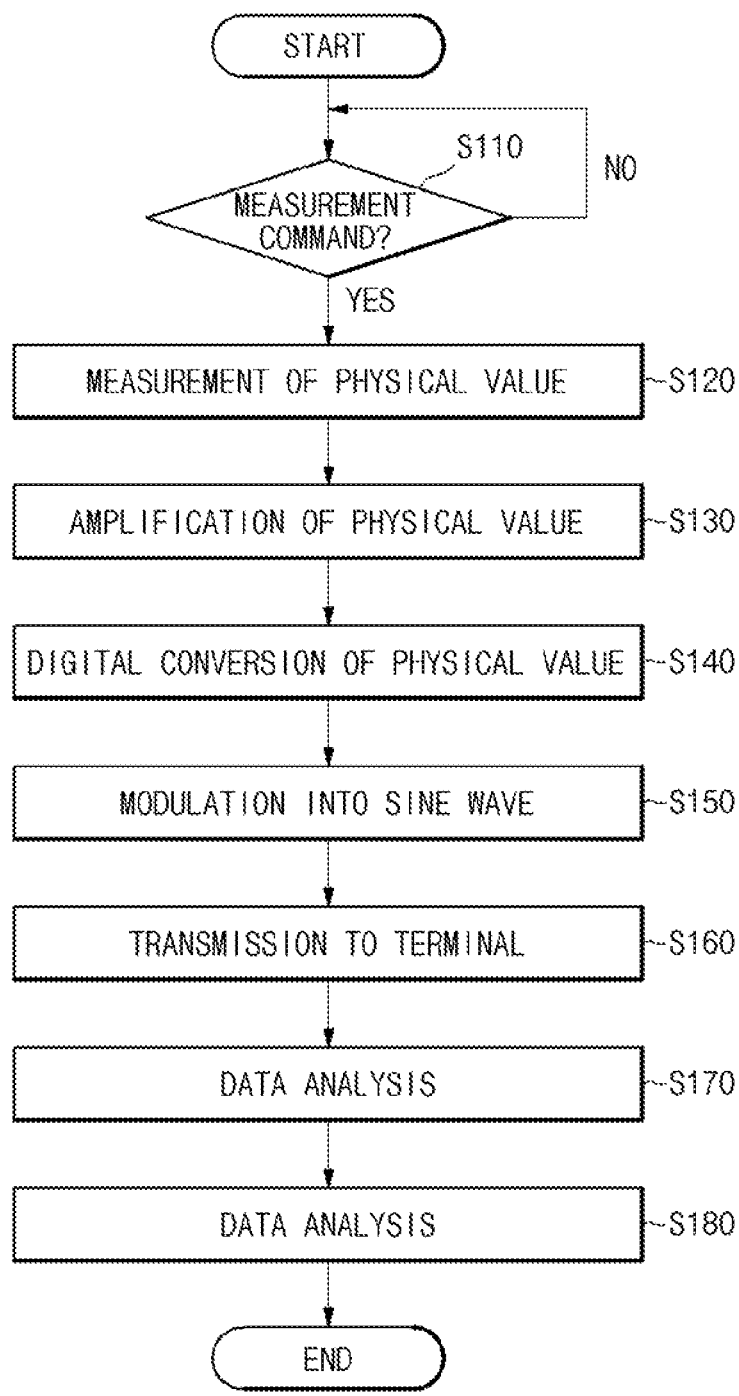

APPARATUS AND METHOD FOR PROCESSING SENSING DATA

CROSS-REFERENCE TO RELATED APPLICATIONS

This patent application claims priority under 35 U.S.C. §119 to Korean Patent Application No. 10-2016-0033866, filed on Mar. 22, 2016, in the Korean Intellectual Property Office, the disclosure of which is incorporated by reference herein in its entirely.

TECHNICAL FIELD

The present disclosure relates to an apparatus and method for processing sensing data, and more particularly, to an apparatus and method for processing sensing data which is configured to communicate with a terminal equipped with a data analyzer and a display through a sound input port, which removes necessity of a separate control unit, a communication unit, or a display for the sensing data processing apparatus, such that the sensing data processing apparatus is simplified and miniaturized while having a light weight.

BACKGROUND OF THE DISCLOSURE

The present disclosure relates to an apparatus and method for processing sensing data.

In general, a sensing apparatus that measures a physical quantity, such as a gas concentration, temperature, humidity, pressure or the like, includes a control unit controlling a measurement operation, a storage unit storing the physical quantity, a communication unit transmitting the measured physical quantity to a server or a data processing apparatus, a display displaying the physical quantity, and a user interface (UI) for a user, which results in a high cost for manufacturing.

Further, the sensing apparatus requires a large amount of current to perform various sensing operations, so the sensing apparatus is inevitably complicated, thereby making it implausible to minimize the sensing apparatus.

In the meantime, an inverter using a square wave among sound waveform signals may enjoy simplified control and a reduced number of times of switching within a period of a basic frequency allowing for a reduced switching loss. However, if a low-speed velocity control is performed in the square wave inserter, a load-side motor may significantly heat up due to a harmonic current, and system stability deteriorated in a low speed area by a LC filter of the DC link terminal.

In command to solve such a problem, the present disclosure provides an apparatus and method for processing sensing data which is configured to communicate with a terminal provided with a data analyzer and a display through a sound input port, which removes necessity of a separate control unit, a communication unit, or a display for the sensing data processing apparatus, such that the sensing data processing apparatus can be simplified and miniaturized while having a light weight.

SUMMARY

According to an embodiment of the present invention, an apparatus for processing sensing data comprises an amplifier amplifying analog sensing data inputted from an outside source, an analog-digital converter converting the amplified analog sensing data into digital sensing data, a micro controller unit (MCU) including a signal modulator modulating the digital sensing data to a data wave having a sound waveform, the data wave transmitted to a sound input port of a terminal, and an output unit having a sound output terminal corresponding to the sound input port and outputting the data wave to the sound input port through the sound output terminal. The data wave inputted to the sound input port is converted to an information value corresponding to the analog sensing data, and the information value is displayed on the terminal.

The digital sensing data includes a 0 and a 1, and the data wave includes a sine wave obtained by modulating a binary value of the digital sensing data. The sine wave may have a first frequency or a second frequency.

The signal modulator generates an inter-bit separation wave having a third frequency lower than the first and second frequencies, and the inter-bit separation wave is outputted between the data wave and a second data wave positioned adjacent to the data wave.

The signal modulator modulates the digital sensing data into a plurality of data waves, and the signal modulator generates an overall-bit separation wave having a fourth frequency lower than the first and second frequencies, and the overall-bit separation wave is outputted after a last one of the plurality of data waves is outputted.

A second inter-bit separation wave is outputted after the last bit data wave is outputted, and a period of the second inter-bit separation wave may be different from a period of the inter-bit separation wave.

Alternatively, the data wave and the inter-bit separation wave may have substantially the same period.

The apparatus further comprises a sensor measuring one or more of physical values including a gas concentration, an air flow rate, a pressure, a temperature, a humidity, a current, a voltage, or a resistance, and the sensor transmits the physical value to the amplifier.

According to an embodiment of the present invention, a method for processing sensing data comprises measuring, by a sensor, a predetermined physical value and outputting analog sensing data, amplifying the analog sensing data in an amplifier, converting the amplified analog sensing data into digital sensing data in an analog-digital converter, modulating, in a signal modulator, the digital sensing data into a data wave having a sine waveform, the data wave transmitted to a sound input port of a terminal, inputting the data wave to the terminal through a sound output terminal corresponding to the sound input port, converting the data wave into an information value corresponding to the analog sensing data, and displaying an information value corresponding to the analog sensing data on the terminal.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 6 is a flowchart, illustrating a method for processing sensing data according to an embodiment of the present disclosure.

DETAILED DESCRIPTION OF EXEMPLARY EMBODIMENTS

Hereinafter, exemplary embodiments of the inventive concept will be described in detail with reference to the accompanying drawings. The inventive concept, however may be modified in various different ways, and should not be construed as limited to the embodiments set forth herein. As used herein, the singular forms "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present. The same reference denotations may be used to refer to the same or similar elements throughout the specification and the drawings.

Embodiments of the present disclosure provide an apparatus and method for processing sensing data.

As used herein, the term "sensing data" may refer to an analog value received from a sensor 130 that measures a predetermined value from an outside environment, a digital value converted or a data wave modulated in the sensing data processing apparatus 100. A value measurable by the sensor 130 includes, but is not limited to, one or more of a concentration of a gas, e.g., carbon monoxide or carbon dioxide in the air, an air flow rate, a pressure of, e.g., a fluid, a temperature, a humidity, a current, a voltage, a resistance or other physical values.

Hereinafter, embodiments of the present disclosure will be described in detail with reference to the accompanying drawings. The same reference denotations may be used to refer to the same or similar elements throughout the specification and the drawings, and no duplicate description will be provided for the same components or elements.

Figure 1:
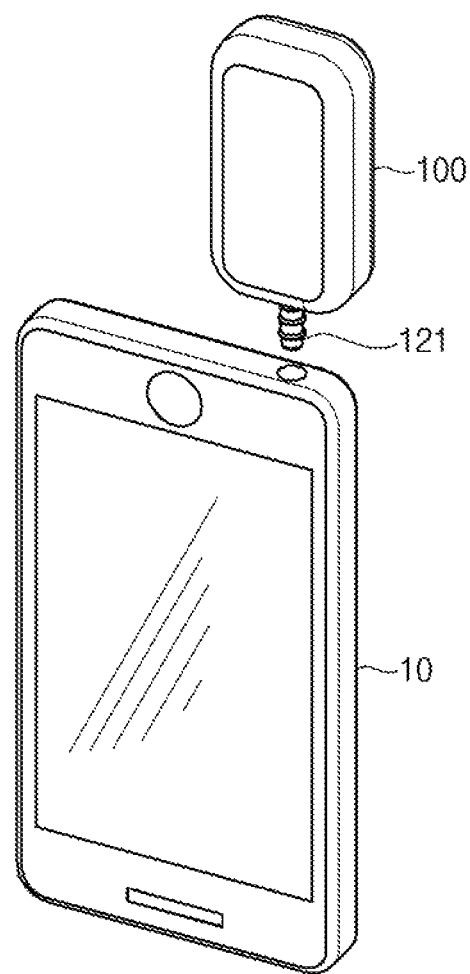
FIG. 1 is a perspective view illustrating a sensing data processing apparatus according to an embodiment of the present disclosure.

FIG. 1 is a perspective view illustrating the sensing data processing apparatus according to an embodiment of the present disclosure.

Referring to FIG. 1, the sensing data processing apparatus 100 may be detachably coupled with a terminal 10 through a sound output terminal 121 protruding from the sensing data processing apparatus 100. A user can attach the sensing data processing apparatus 100 to the terminal 10 to transmit sensing data to the terminal 10.

The sensing data processing apparatus 100 can receive a measurement command signal for a predetermined physical value from the terminal 10 through the sound output terminal 121.

The terminal 10 may be a personal computer (PC) or a sensing data analysis-calculation device, or a portable terminal including, but not limited to, a smart phone or a personal digital assistant (PDA).

Figure 2:
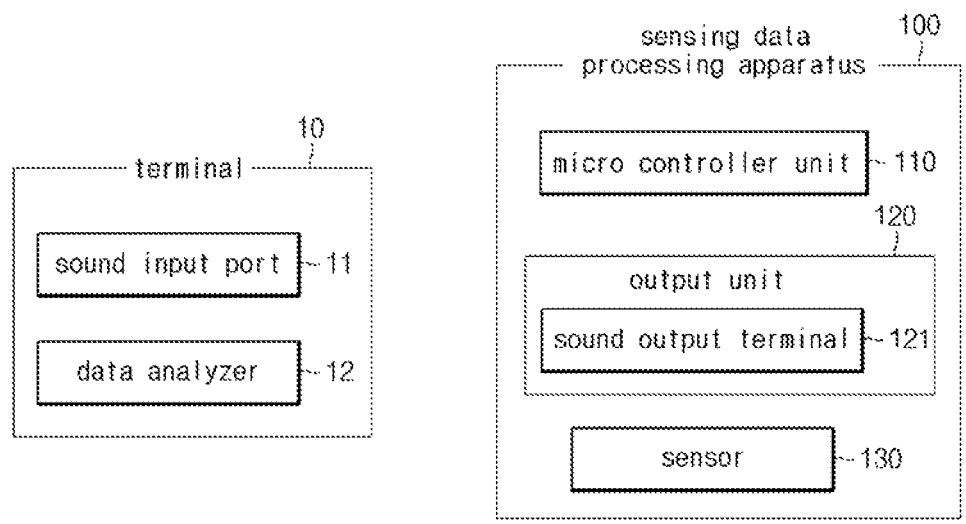
FIG. 2 is a block diagram illustrating a sensing data processing apparatus according to an embodiment of the present disclosure.
Figure 3:
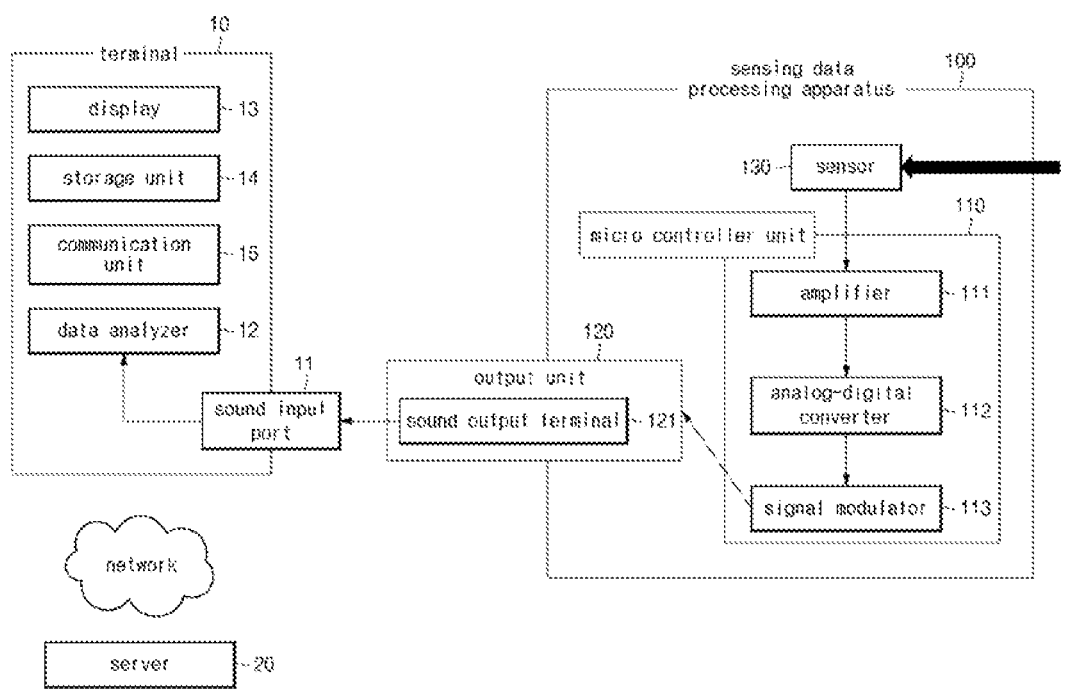
FIG. 3 is a block diagram illustrating a sensing data processing apparatus according to an embodiment of the present disclosure.

FIGS. 2 and 3 are block diagrams illustrating a sensing data processing apparatus according to an embodiment of the present disclosure.

Referring to FIGS. 2 and 3, the sensing data processing apparatus 100 includes a micro controller unit (MCU) 110, an output unit 120, and a sensor 130.

The MCU 110 includes an amplifier 111 amplifying analog sensing data inputted from an outside source, an analog-digital converter 112 converting the amplified analog sensing data into digital sensing data, and a signal modulator 113 modulating the digital sensing data into a data wave having a sound waveform.

The amplifier 111 amplifies the analog sensing data measured and inputted from an outside environment at a predetermined amplification ratio. For example, when the inputted analog sensing data is a gas concentration, the amplification ratio may be a ratio of 1 mV to 1 ppm.

The analog-digital converter 112 converts the analog sensing data amplified by the amplifier 111 into 12-bit digital sensing data.

The signal modulator 113 may include, but is not limited to, a pulse width modulation (PWM) generator. The signal modulator 113 modulates the digital sensing data converted by the analog-digital converter 112 into a data wave of a sound waveform transmittable to a sound input port 11 of the terminal 10.

The output unit 120 includes the sound output terminal 121 corresponding to the sound input port 11 of the terminal 10, and the output unit 120 outputs the sound waveform of data wave modulated and outputted by the signal modulator 113 through the sound output terminal 121 to the sound input port 11.

The terminal 10 may include a data analyzer 12 and a display 13. The data analyzer 12 converts the sound waveform of data wave inputted through the sound input port 11 into an information value corresponding to the analog sensing data inputted from an outside source. The display 13 displays the information value. The sound waveform of data wave transmitted from the sensing data processing apparatus 1000 to the terminal 10 may be displayed by the display 13 as the information value corresponding to the analog sensing data input from the outside source.

The data analyzer 12 analyzes a period and frequency of the sound waveform of data wave transmitted to the terminal 10 and extracts a predetermined value, graph, or color according to each frequency and period and transmits the extracted value, graph, or color to the display 13.

The terminal 10 may further include a storage unit 14 for storing the received sound waveform of data wave, e.g., sensing data. The terminal 10 may further include a communication unit 15 for transmitting or receiving sensing data from a server 20 connected to the terminal 10 via a wired or wireless network.

The sensor 130 measures one or more of a concentration of a gas, e.g., carbon monoxide or carbon dioxide in the air, an air flow rate, a pressure of, e.g., a fluid, a temperature, a humidity, a current, a voltage, a resistance or other physical values, and transmits the measured result to the amplifier 111.

The sensor 130 is replaceable from the sensing data processing apparatus 100, allowing the sensing data processing apparatus 100 to be compatible with various types of sensors that can measure various physical values.

An algorithm of modulating the digital sensing data into a sine waveform of data wave by the signal modulator 113 of the sensing data processing apparatus 100 is described according to an embodiment of the present disclosure.

The signal modulator 113 may modulate binary data values (e.g., 1 and 0) of the digital sensing data, outputted from the analog-digital converter 112, into sinusoidal data waves having a predetermined first frequency or a predetermined second frequency and output the sinusoidal data waves.

The first frequency and the second frequency may be set to be different from each other. For example, one of the first frequency and the second frequency may be a multiple of the other.

As such, the digital sensing data is modulated into sinusoidal data waves instead of conventional square waveforms. Thus, an error may be prevented from occurring during communication while enabling stable data communication.

The signal modulator 113 generates an inter-bit separation wave having a third frequency that is set to be lower than the first and second frequencies. The inter-bit separation wave may be outputted between two adjacent ones of sinusoidal data waves.

Alternatively, the sinusoidal data waves and the inter-bit separation wave may be outputted simultaneously.

In this case, the period n of the inter-bit separation wave may be set to be the same as the period n of the data waves (where, n=1, 2, or 3).

Here, the period n of the inter-bit separation wave outputted after the data wave of the last binary value is outputted may be set to be longer than the period n of other inter-bit separation waves.

According to an embodiment of the present disclosure, an overall-bit separation wave having a fourth frequency lower than the first and second frequencies may be generated and outputted after the data wave of the last binary value is outputted.

In this case, the period n of the overall-bit separation wave may be set to be longer than the period n of inter-bit separation waves, such that the overall-bit separation wave plays a role as a marker indicating that the data waves corresponding to the 12-bit digital sensing data are outputted.

Figure 4:
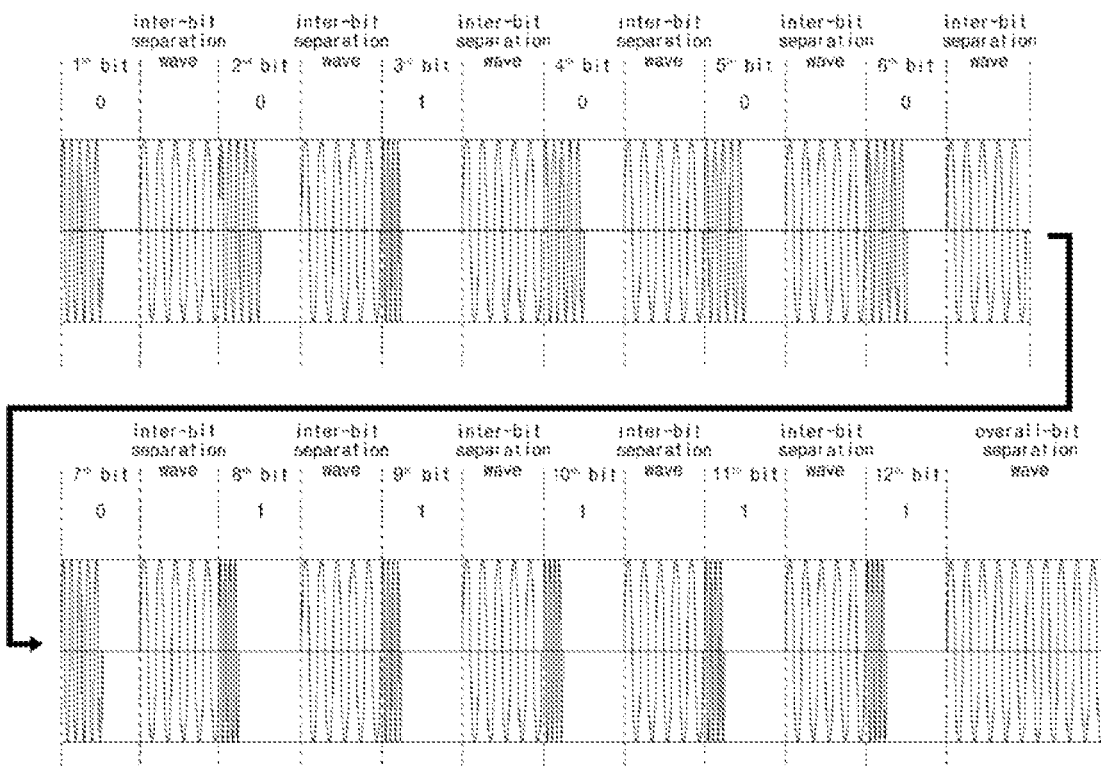
FIG. 4 is a view illustrating an example of sine waves over time, modulated by a signal modulator and outputted, according to an embodiment of the present disclosure.

FIG. 4 is a view illustrating an example of sine waves over time (t), modulated by a signal modulator and outputted, according to an embodiment of the present disclosure.

Referring to FIG. 4, the signal modulator 113 modulates a 1 of the digital sensing data outputted from the analog-digital converter 112 into a sinusoidal data wave having a first frequency, e.g., 400 Hz, and a period of 5 and modulates a 0 of the digital sensing data into a sinusoidal data wave having a second frequency, e.g., 200 Hz, and a period of 5.

The signal modulator 113 further generates the inter-bit separation wave having a third frequency, e.g., 100 Hz, lower than the first and second frequencies, and a period, of 5 and outputs the generated inter-bit separation wave between two adjacent ones of sinusoidal data waves.

Among the inter-bit separation waves, the inter-bit separation wave outputted after the data wave of the last binary value is outputted is set to have a period of 10, which is longer than the period, e.g., 5, of other inter-bit separation waves, so that the inter-bit separation wave may function as a marker indicating that the 12-bit digital sensing data is all outputted.

The signal modulator 113 may generate the overall-bit separation wave, e.g., a sine wave having the fourth frequency, e.g., 100 Hz, and a period of 10 and output the overall-bit separation wave after the last date wave is outputted.

For example, when the sensing data inputted from the sensor is a gas concentration that is 543 ppm, the sensing data may be converted into a binary number 001000011111 (digital sensing data), and the converted digital sensing data may be outputted as data waves respectively corresponding to the bits, with each inter-bit separation wave interposed between two adjacent ones of the data waves. The data waves and the inter-bit separation waves may be alternately outputted.

For example, a 200-Hz, 5-period sinusoidal data wave corresponding to a 0 of the digital sensing data, followed by a 100-Hz, 5-period sinusoidal inter-bit separation wave, is outputted in a first bit (1st bit) and transmitted to the terminal 10, as shown in FIG. 4. Next, a 200-Hz, 5-period sinusoidal data wave, corresponding to a 0 of the digital sensing data, followed by a 100-Hz, 5-period sinusoidal inter-bit separation wave, is outputted in the second bit (2nd bit) and transmitted to the terminal 10. A 400-Hz, 5-period sinusoidal data wave, corresponding to a 1 of the digital sensing data, followed by a 100-Hz, 5-period sinusoidal inter-bit separation wave, is outputted in the third bit (3rd bit) and transmitted to the terminal 10.

Data waves and inter-bit separation waves are alternately outputted up to the 12th bit, and then, a 100-Hz, 10-period sinusoidal overall-bit separation wave is outputted, indicating that the whole 12-bit digital sensing data are transmitted to the terminal 10.

Figure 5:
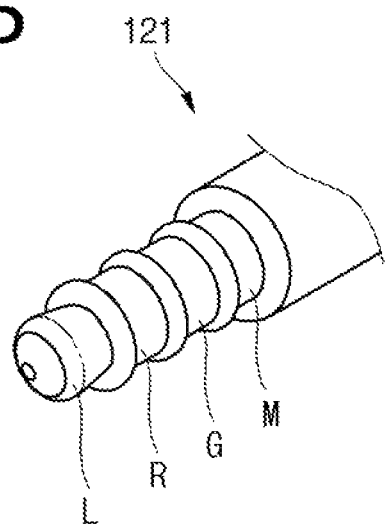
FIG. 5 is a view illustrating a sound output terminal of a sensing data processing apparatus according to an embodiment of the present disclosure.

FIG. 5 is a view illustrating a sound output terminal of a sensing data processing apparatus according to an embodiment of the present disclosure.

Referring to FIG. 5, the sound output terminal 121 has a similar shape to a typical earphone terminal having a four-electrode jack, and thus it can be compatible with any sound input ports provided in other terminals.

The sound output terminal 121 protruding from the sensing data processing apparatus 100 includes a microphone terminal (M) for entry of a sound signal and a grounding terminal (G). The sound output terminal 121 may further include audio terminals L and R for outputting a sound signal.

FIG. 6 is a flowchart illustrating a method for processing sensing data according to an embodiment of the present disclosure.

The method will be described in detail with reference to FIG. 6.

It is determined whether a command to measure a predetermined physical value is received from the terminal 10, e.g., by the sensor 130 (step S110). Upon receiving the command, the physical value, e.g., one or more of a concentration of a gas, e.g., carbon monoxide or carbon dioxide in the air, an air flow rate, a pressure of a fluid, a temperature, a humidity, a current, a voltage, a resistance or other physical values, is measured (step S120).

Alternatively, the physical value may be measured by a user's selection or automatically, e.g., in accordance with a predetermined time or a time interval, without step S110.

The physical value measured at step S120, which is analog sensing data, is amplified in the Amplifier 111 (step S130) to be processable in next steps.

The analog sensing data amplified at step S130 is converted into 12-bit digital sensing data in the analog-digital converter 112 (step S140).

The digital sensing data converted at step S140 is modulated by the signal modulator 113 into a sound waveform of data wave, which may be transmitted to the terminal 10 through the sound input port 11 (step S150).

In this case, the sound waveform of data wave may be a sine wave having a predetermined frequency and a period n according to each bit of the digital sensing data.

Next, the sound-waveform data wave modulated at step S150 is transmitted to the terminal 10 through the sound output terminal 121 corresponding to the sound input port 11 of the terminal 10 (step S160).

The sound-waveform data wave transmitted to the terminal 10 at step S160 is converted to an information value corresponding to the analog sensing data by the data analyzer 12 (step S170).

The information value converted at step S170 is displayed through a display 13 (step S180).

The sensing data processing apparatus according to an exemplary embodiment of the present disclosure is configured to communicate with the terminal equipped with a data analyzer and a display through the sound input port, which removes necessity of a separate control unit, a communication unit, or a display, such that the sensing data processing apparatus is simplified and miniaturized while having a light weight.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus for processing sensing data, comprising:
   an amplifier amplifying analog sensing data inputted from an outside source;
   an analog-digital converter converting the amplified analog sensing data into digital sensing data;
   a micro controller unit (MCU) including a signal modulator modulating the digital sensing data to a data wave having a sound waveform, the data wave transmitted to a sound input port of a terminal; and
   an output unit having a sound output terminal corresponding to the sound input port and outputting the data wave to the sound input port through the sound output terminal, wherein the data wave inputted to the sound input port is converted to an information value corresponding to the analog sensing data, and the information value is displayed on the terminal, wherein the data wave includes a sine wave obtained by modulating a binary value of the digital sensing data, the sine wave having a first frequency or a second frequency, wherein the signal modulator generates an inter-bit separation wave having a third frequency lower than the first and second frequencies, and wherein the inter-bit separation wave is outputted between the data wave and a second data wave positioned adjacent to the data wave.

2. The apparatus of claim 1, wherein the digital sensing data includes a plurality of binary values, wherein a second inter-bit separation wave is outputted after a data wave of a last one of the plurality of binary values is outputted, and wherein a period of the second inter-bit separation wave is different from a period of the inter-bit separation wave.

3. The apparatus of claim 1, wherein the data wave and the inter-bit separation wave have substantially the same period.

4. The apparatus of claim 1, further comprises a sensor measuring one or more of physical values including a gas concentration, an air flow rate, a pressure, a temperature, a humidity, a current, a voltage, or a resistance, and the sensor transmits the physical value to the amplifier.

5. An apparatus for processing sensing data, comprising:
   an amplifier amplifying analog sensing data inputted from an outside source;
   an analog-digital converter converting the amplified analog sensing data into digital sensing data;
   a micro controller unit (MCU) including a signal modulator modulating the digital sensing data to a data wave having a sound waveform, the data wave transmitted to a sound input port of a terminal; and
   an output unit having a sound output terminal corresponding to the sound input port and outputting the data wave to the sound input port through the sound output terminal, wherein the data wave inputted to the sound input port is converted to an information value corresponding to the analog sensing data, and the information value is displayed on the terminal, wherein the data wave includes a sine wave obtained by modulating a binary value of the digital sensing data, the sine wave having a first frequency or a second frequency, wherein the signal modulator modulates the digital sensing data into a plurality of data waves, and the signal modulator generates an overall-bit separation wave having a fourth frequency lower than the first and second frequencies, and wherein the overall-bit separation wave is outputted after a last one of the plurality of data waves is outputted.

6. A method for processing sensing data, the method comprising:
   measuring, by a sensor, a predetermined physical value and outputting analog sensing data;
   amplifying the analog sensing data in an amplifier;
   converting the amplified analog sensing data into digital sensing data in an analog-digital converter;
   modulating, in a signal modulator, the digital sensing data into a data wave having a sine waveform, the data wave transmitted to a sound input port of a terminal;
   inputting the data wave to the terminal through a sound output terminal corresponding to the sound input port;
   converting the data wave into an information value corresponding to the analog sensing data; and
   displaying the information value corresponding to the analog sensing data on the terminal, wherein the data wave includes a sine wave obtained by modulating a binary value of the digital sensing data, the sine wave having a first frequency or a second frequency, wherein the signal modulator generates an inter-bit separation wave having a third frequency lower than the first and second frequencies, and wherein inter-bit separation wave is outputted between the data wave and a second data wave positioned adjacent to the data wave.

* * * * *